(12) United States Patent
Jeong

(10) Patent No.: US 8,663,691 B2
(45) Date of Patent: Mar. 4, 2014

(54) GEL COMPOSITION FOR SHOWER FILTER, METHOD FOR MANUFACTURING SHOWER GEL FILTER AND SHOWER FILTER

(76) Inventor: Ji-hang Jeong, Daejeon (KR)

( * ) Notice: Subject to any disclaimer, the term of this patent is extended or adjusted under 35 U.S.C. 154(b) by 131 days.

(21) Appl. No.: 13/382,456

(22) PCT Filed: Jul. 7, 2010

(86) PCT No.: PCT/KR2010/004409
§ 371 (c)(1),
(2), (4) Date: Jan. 5, 2012

(87) PCT Pub. No.: WO2011/005020
PCT Pub. Date: Jan. 13, 2011

(65) Prior Publication Data
US 2012/0111422 A1 May 10, 2012

(30) Foreign Application Priority Data
Jul. 7, 2009 (KR) ........................ 10-2009-0061824

(51) Int. Cl.
*A61K 9/14* (2006.01)
*G05D 11/00* (2006.01)
*A61K 9/00* (2006.01)

(52) U.S. Cl.
USPC ...................... 424/488; 137/101.11; 424/400

(58) Field of Classification Search
None
See application file for complete search history.

(56) References Cited

U.S. PATENT DOCUMENTS 3,961,628 A * 6/1976 Arnold .......................... 424/427
2002/0153505 A1 10/2002 Blakemore et al.
2004/0069719 A1 * 4/2004 Wang ............................. 210/749

FOREIGN PATENT DOCUMENTS

| JP | 10-286576 | 10/1998 |
| KR | 10-2004-0053782 | 6/2004 |
| KR | 10-2005-0070509 | 7/2005 |

OTHER PUBLICATIONS

JP 10-286576, machine translation, (Oct. 1998), pp. 1-8.*
KR 20050070509, Kim, Jong-Sun, (Jul. 7, 2005), machine translation, pp. 1-11.*
JP 2004-231518, Ishii Tomoumi, et al., (Aug. 19, 2004), machine translation, pp. 1-18.*
International Search Report—PCT/KR2010/004409 dated Feb. 25, 2011.

* cited by examiner

*Primary Examiner* — Scott Long
*Assistant Examiner* — Lyndsey Beckhardt
(74) *Attorney, Agent, or Firm* — Cantor Colburn LLP

(57) ABSTRACT

Provided are a gel composition for a shower filter with viscosity restorability, a method for manufacturing a shower gel filter and a shower filter. More particularly, the gel composition for a shower filter includes dextrin, a fragrance, water and a water-soluble cellulose ether, and may further include vitamin C intended to remove residual chlorine and harmful substances contained in water, and a food coloring intended to allow the users to identify a particular type of fragrance.

2 Claims, No Drawings

GEL COMPOSITION FOR SHOWER FILTER, METHOD FOR MANUFACTURING SHOWER GEL FILTER AND SHOWER FILTER

TECHNICAL FIELD

The present invention relates to a gel composition for a shower filter with viscosity restorability, a method for manufacturing a shower gel filter and a shower filter, and more particularly, to a gel composition for a shower filter including dextrin, a fragrance, water and a water-soluble cellulose ether, which may further include vitamin C intended to remove residual chlorine and harmful substances contained in water, and a food coloring intended to allow the users to identify a particular type of fragrance.

BACKGROUND ART

In Korea, tap water is subjected to chlorine-based sterilization using sodium hypochlorite. In other words, water is purified first in a water purification plant through chlorine treatment to remove organic compounds as well as to perform sterilization, and then chlorine is further injected to the thus treated water to retain the residual chlorine, thereby preventing diseases mediated by waterborne pathogens.

However, chlorine is one of halogen elements and is a toxic substance for use in oxidants, bleaching agents, disinfecting agents, etc. Chlorine in tap water also reacts with organic compounds to generate organochlorine compounds (environmental hormones) that adversely affect the human health and the environment. Particularly, it reacts with and destroys skin proteins forming the human skin, resulting in skin roughness, skin aging and various types of skin troubles.

Meanwhile, a shower used in a home or a public bath is linked to a faucet via a hose to eject tap water like a fountain. Such a shower generally includes a grip portion equipped with a hose linking port and a shower head portion having multiple water ejection ports. In addition, the chlorine content introduced into a water purification plant is not removed completely but still remains in tap water discharged from a shower. Therefore, direct drinking such tap water gives a bad smell unique to tap water and causes absorption of harmful chlorine into the human body.

Further, chlorine destroys hair proteins as well as skinproteins, resulting in rough hair. It also adversely affects the condition of a scalp and thus hair loss. Atopic dermatitis may be seriously deteriorated by chlorine.

Despite such problems, it is not economic to use water purified by a water purifier in order to filter off the chlorine content. Therefore, there is an imminent need for the solution to overcome such problems.

Accordingly, the residual chlorine in tap water causes dermatitis in children or persons having weak skins. In addition, the chlorine content contained in steam generated when heating tap water is significantly harmful to persons having weak bronchial tubes and lungs. Moreover, such chlorine content adversely affects human health, and for example, damages cells in human hair.

DISCLOSURE OF INVENTION

Technical Problem

An object of the present invention is to provide a gel composition for a shower filter, which includes dextrin, a fragrance, water and a water-soluble cellulose ether and has viscosity restorability.

Another object of the present invention is to provide a method for manufacturing a shower gel filter.

Still another object of the present invention is to provide a shower filter.

Solution to Problem

There are provided a gel composition for a shower filter with viscosity restorability, a method for manufacturing a shower gel filter and a shower filter. More particularly, there is provided a gel composition for a shower filter including dextrin, a fragrance, water and a water-soluble cellulose ether, which may further include vitamin C intended to remove residual chlorine and harmful substances contained in water, and a food coloring intended to allow the users to identify a particular type of fragrance.

In one general aspect, a gel composition for a shower filter includes: 100 parts by weight of dextrin 5-45 parts by weight of a fragrance 5-50 parts by weight of water; and 0.1-20 parts by weight of a water-soluble cellulose ether. The gel composition may further include vitamin C or a derivative thereof in order to remove residual chlorine and harmful substances contained in water. The gel composition may further include a food coloring so that the users may identify a particular type of fragrance.

Dextrin is generated in the course of hydrolysis of starch and refers to glucose in its polymerized state. Dextrin serves not only as a pouch in which the fragrance is received but also as a wrap with which the additive vitamin C or a derivative thereof is covered sufficiently so that it is not decomposed. In this manner, the filter contents are prevented from rapid solidification, while the fragrance and vitamin C or a derivative thereof are dissolved gradually when water infiltrates thereto. Such dextrin has an average degree of polymerization (DP) of 3-25 and consists of any one selected from maltodextrin, cyclodextrin, amylodextrin, α-limit dextrin and β-limit dextrin. When dextrin has an average degree of polymerization greater than 25, dextrin may be dissolved excessively, and thus it is not possible to provide a desired release-control effect. On the other hand, when dextrin has an average degree of polymerization less than 3, dextrin may be dissolved so slowly that the fragrance or vitamin C or a derivative thereof may not be released in a timely manner.

The fragrance is used in an amount of 5-45 parts by weight, preferably 5-35 parts by weight based on 100 parts by weight of dextrin. The fragrance may be water-soluble or oil-soluble aromatic fragrance and used in an oil form or powder form. Particular examples of the fragrance include lemon, lavender, jasmine, pine, rosemary, rose, eucalyptus or ylang-ylang. Such fragrances may be used alone or in combination. In addition, the fragrance may be used as a constituent of the gel composition for a shower filter as a single part, or may be used after it is added to dextrin. Preferably, an oil-soluble fragrance may be used so that water infiltration is delayed and dextrin serves as a carrier for a longer time.

The water-soluble cellulose ether is used in an amount of 0.1-20 parts by weight based on 100 parts by weight of dextrin. The water-soluble cellulose ether is intended to control the solubility of the contents in a filter. In other words, it causes the contents in a filter to be dissolved easily in cold water, or to be dissolved slowly in hot water. In addition, the water-soluble cellulose ether tends to prevent the contents in a filter from solidifying until a certain time. As a result, when the temperature increases to 40° C. or higher, the viscosity of the contents in a filter decreases rapidly, resulting in gelling. On the other hand, when the temperature decreases to 15° C. or lower, the contents in a filter returns to their original solution state. In other words, the contents in a filter have viscosity restorability. The water-soluble cellulose ether may be selected from methyl cellulose, hydroxypropylmethyl cellulose and hydroxyethylmethyl cellulose. More preferably, 0.1-5 parts by weight of a water-soluble cellulose ether may be used based on 100 parts by weight of dextrin.

Water is used in an amount of 5-50 parts by weight based on 100 parts by weight of dextrin in order to provide the composition for a shower filter in the form of a gel. When water is used in an amount less than 5 parts by weight, the composition may not be gelled due to such a small amount of water and it is difficult to agitate the composition. When water is used in an amount greater than 50 parts by weight, the filter ingredients may be dissolved easily due to such a large amount of water, resulting in degradation of lifetime of the filter. More preferably, 5-35 parts by weight of water may be used based on 100 parts by weight of dextrin.

The gel composition for a shower filter may further include 15-70 parts by weight, preferably 20-60 parts by weight of vitamin C or a derivative thereof based on 100 parts by weight of dextrin. Vitamin C or a derivative thereof removes the residual chlorine contained in tap water in a large amount, and provides a weak acid-based sterilization effect because it maintains its unique acidity. Any derivatives of vitamin C may be used with no particular limitation. Preferred examples of the derivative of vitamin C include sodium ascorbate, magnesium ascorbate, sodium ascorbyl phosphate, magnesium ascorbyl phosphate, calcium ascorbyl phosphate, ascorbyl acetate, ascorbyl propionate, ascorbyl stearate, ascorbyl palmitate, ascorbyl dipalmitate, ascorbyl glucoside, ascorbic acid polypeptide, ethyl ascorbyl ether or ascorbyl ethyl silanol pectinate.

The gel composition for a shower filter may further include 0.1-10 parts by weight, preferably 0.1-5 parts by weight of a food coloring based on 100 parts by weight of dextrin, so that the users may identify a particular type of fragrance. The food coloring is a pigment susceptible to fluorescence light and direct light, and particular examples thereof include at least one selected from the group consisting of Food Red No. 2, Food Red No. 2 Aluminum Lake, Food Red No. 3, Food Red No. 40, Food Red No. 40 Aluminum Lake, Food Yellow No. 4, Food Yellow No. 4 Aluminum Lake, Food Yellow No. 5, Food Yellow No. 5 Aluminum Lake, Food Green No. 3, Food Green No. 3 Aluminum Lake, Food Blue No. 1, Food Blue No. 1 Aluminum Lake, Food Blue No. 2 and Food Blue No. 2 Aluminum Lake.

In another general aspect, the shower gel filter is obtained by a method including:

agitating 100 parts by weight of dextrin, 5-45 parts by weight of a fragrance, 5-50 parts by weight of water and 0.1-20 parts by weight of a water-soluble cellulose ether at a temperature of 25-45° C.

filling a polypropylene (PP) or polyethylene (PE) container with the agitated contents; and curing the contents at a temperature of 15-30° C. for 3-10 hours.

When agitating the contents, 15-70 parts by weight of vitamin C or a derivative thereof and 0.1-10 parts by weight of a food coloring may be further added. In addition, when the agitation is carried out at a temperature range away from 25-45° C., the viscosity increases undesirably, resulting in degradation of workability. When containers other than PP or PE containers are used, they may be degraded and broken easily. Further, when the contents received in the container is tilted upon the curing of the contents, high-quality products may not be obtained due to bubble generation.

Advantageous Effects of Invention

The gel composition for a shower filter includes various types of fragrances depending on the user's preference, dextrin, water and a water-soluble cellulose ether. The gel composition may further include vitamin C intended to remove residual chlorine and harmful substances contained in water, and a food coloring intended to allow the users to identify a particular type of fragrance. Due to the presence of dextrin in the gel composition, a unique fragrance is imparted continuously to water passed from a shower filter, thereby realizing an effect of aromatherapy. In addition, since the gel composition for a shower filter includes a water-soluble cellulose ether, the contents in a filter are not solidified until a certain time. The viscosity of the gel composition decreases rapidly when the temperature increases, and thus the gel composition is gelled. However, the gel composition returns to its original solution state when the temperature decreases. In this manner, the gel composition shows viscosity restorability.

MODE FOR THE INVENTION

The examples will now be described. The following example is for illustrative purposes only and not intended to limit the scope of the present invention.

EXAMPLE

Manufacture of Shower Gel Filter

First, 25.97 g of dextrin, 4.87 g of an aromatic fragrance, 0.36 g of methyl cellulose, 12.98 g of vitamin C and 0.14 g of a food coloring are mixed and introduced into an agitator. Next, 5.68 g of water is added thereto and the resultant mixture is agitated for 2 hours while the internal temperature of the agitator is maintained at 33° C. to obtain a gelled product. Then, a transparent polypropylene (PP) or polyethylene (PE) container is filled with the gelled product. The container with the contents is cured at 24° C. for 8 hours to obtain a shower gel filter.

Different food colorings used with different aromatic fragrances

TABLE 1

| Fragrance | Food coloring |
| --- | --- |
| Lemon | Gardenia LHF-8544 |
| Jasmine | Blue LHF-21259 |
| Rose | Red LHF-21255 |
| Rosemary | Purple LHF-21261 |
| Lavender | Dark blue LHF-21260 |
| Pine | Green LHF-21258 |
| Eucalyptus | Yellow LHF-21257 |

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A method for producing a shower gel filter, comprising:

agitating 100 parts by weight of dextrin, 5-45 parts by weight of a fragrance, 5-50 parts by weight of water and 0.1-20 parts by weight of a water-soluble cellulose ether at a temperature of 25-45° C. filling a polypropylene (PP) or polyethylene (PE) container with the agitated contents; and curing the contents at a temperature of 15-30° C. for 3-10 hours.

2. The method according to claim 1, wherein 15-70 parts by weight of vitamin C or a derivative thereof and 0.1-10 parts by weight of a food coloring are further included in said agitating.

* * * * *